US012579370B2

(12) United States Patent
Yannam et al.

(10) Patent No.: US 12,579,370 B2
(45) Date of Patent: Mar. 17, 2026

(54) MULTILINGUAL CHATBOT

(71) Applicant: Bank of America Corporation, Charlotte, NC (US)

(72) Inventors: Ramakrishna R. Yannam, The Colony, TX (US); Emad Noorizadeh, Plano, TX (US); Jennifer Russell, Dallas, TX (US); Rajan Jhaveri, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 785 days.

(21) Appl. No.: 17/993,063

(22) Filed: Nov. 23, 2022

(65) Prior Publication Data

US 2024/0169158 A1 May 23, 2024

(51) Int. Cl.

| | |
|---|---|
| ***G06F 40/35*** | (2020.01) |
| ***G06F 40/242*** | (2020.01) |
| ***G06F 40/263*** | (2020.01) |
| ***G06F 40/279*** | (2020.01) |
| ***G06F 40/58*** | (2020.01) |

(52) U.S. Cl.

CPC ............ *G06F 40/35* (2020.01); *G06F 40/242* (2020.01); *G06F 40/263* (2020.01); *G06F 40/279* (2020.01); *G06F 40/58* (2020.01)

(58) Field of Classification Search

CPC ...... G06F 40/35; G06F 40/242; G06F 40/263; G06F 40/279; G06F 40/58

USPC ........................................................... 704/2

See application file for complete search history.

(56) References Cited

U.S. PATENT DOCUMENTS

| | | | | |
|---|---|---|---|---|
| 2020/0184158 | A1* | 6/2020 | Kuczmarski | G06N 20/00 |
| 2022/0284198 | A1* | 9/2022 | Kuczmarski | G06F 16/3337 |
| 2023/0157631 | A1* | 5/2023 | Sletten | G16H 20/30 600/301 |
| 2023/0162721 | A1* | 5/2023 | Agrawal | G10L 15/005 704/260 |
| 2024/0135232 | A1* | 4/2024 | Betteridge | G06N 20/00 |
| 2024/0169158 | A1* | 5/2024 | Yannam | G06F 40/263 |
| 2025/0131147 | A1* | 4/2025 | Bielke | G06F 30/17 |

FOREIGN PATENT DOCUMENTS

| | | | | |
|---|---|---|---|---|
| TW | I779599 B | * 10/2022 | | G06F 40/58 |
| WO | WO-2025039925 A1 | * 2/2025 | | G06F 18/214 |

* cited by examiner

*Primary Examiner* — Edwin S Leland, III

(74) *Attorney, Agent, or Firm* — Weiss & Arons LLP

(57) ABSTRACT

A method for reducing response time of an utterance received in a multilingual chatbot system may be provided. The utterance may be received in a language other than a default language with respect to the multilingual chatbot system. The method may include receiving a request utterance from a remote user device and determining that the request utterance is not in the default language. In response to the determining, the method may include transmitting the request utterance, in parallel, to both a translational track for translating the request utterance and an intelligence track for translating the request utterance. The method may include computing a first intent of the translated request utterance at the translational track. The method may include computing a second intent based on a ML request utterance. The method may include determining that the first intent matches the second intent and following the determining, generating a response utterance.

14 Claims, 4 Drawing Sheets

MULTILINGUAL CHATBOT

FIELD OF TECHNOLOGY

Aspects of the disclosure relate to multilingual chatbot systems.

BACKGROUND OF THE DISCLOSURE

Many entities interface with users and customers using automated chatbots. Automated chatbots allow users to receive customer service at any time. Chatbots may be capable of answering common questions and providing transactional support. The chatbot receives input from a human user. The inputs may be voice, text or selection of choices presented by the chatbot. The inputs correspond to the user expressing a purpose or reason why the user needs customer service or transaction support. Chatbots use a variety of techniques to correctly discern the meaning of the user's inputs and provide automated responses that efficiently service the user.

Customers using the automated chatbots may not all speak the same language. The native language of many customers may be in a language other than the default language of the automated chatbot.

It would be desirable to provide systems and methods for multilingual chatbot systems that combine machine learning and artificial intelligence to accurately and speedily translate inputs received in multiple languages.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
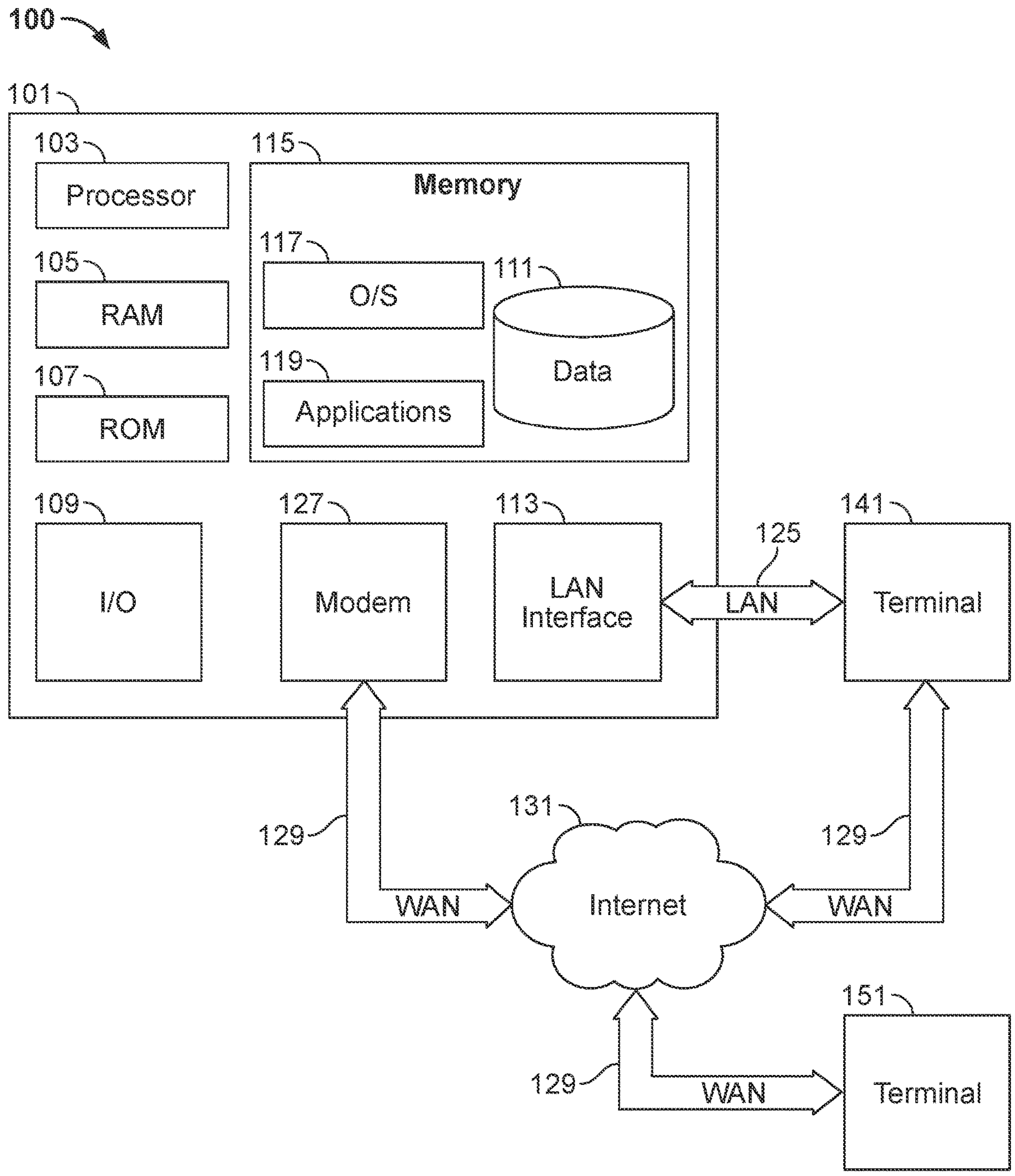
FIG. 1 shows an illustrative block diagram in accordance with principles of the disclosure.

A multilingual chatbot system is provided. The multilingual chatbot system may be configured for enabling reducing of the response time of an utterance received in a language other than a default language with respect to the multilingual chatbot system.

In some embodiments, the default language may be the English language. The multilingual chatbot system may be configured for receiving request utterances in all languages. A second language may be any language other than English.

In some embodiments, the default language may be a language other than English. To the extent that the default language is in a language other than English, the second language may be the English language.

The multilingual chatbot system may be configured to receive a request utterance from a remote user device. The request utterance may represent a customer request.

The remote user device may include any computing device. The remote user device may include a customer's personal computer and the request utterance may be in the form of a text and/or chat message. The remote user device may be a telephone and the request utterance may be a voice input.

In some embodiments, the utterance may be a gesture. For purposes of the disclosure, the gesture may be a cultural gesture.

The multilingual chatbot system may be configured to determine that the request utterance is not in the default language. The request utterance may be in a second language. The default language may be referred to, in the alternative, as a first language.

In response to the determining that the request utterance is in the second language, the multilingual chatbot system may be configured to transmit the request utterance to both a translational track for translating the request utterance and an intelligence track for translating the request utterance. It should be appreciated that the translational track and the intelligence track may process the request utterance in parallel with one another.

The translational track may be a software application running within the multilingual chatbot system. The translational track may perform literal translations on second language utterances.

It should be appreciated that for each language there may be a separate translational track and a corresponding intelligence track.

The intelligence track may also be a software application running within the multilingual chatbot system. The intelligence track may leverage literal translation, common sense using artificial intelligence ("AI"), native language connotations and entity logic to get a most accurate prediction. The intelligence track may include a machine learning ("ML") model that may be continuously re-trained for accuracy.

By running the translational track and the intelligence track within the architecture of the system, this may reduce response time for responding to request utterances by one or more orders of magnitude. The response time may be reduced from approximately five hundred milliseconds, when reaching out to a third-party translation application, to five milliseconds using in-house translation.

The translational track may perform accurate translations on at least ninety percent of the utterances. In some embodiments, when the translational track fails to perform an accurate translation, the multilingual chatbot system may transmit the utterance to a third-party translator for translation. When the utterance is transmitted to the third-party for translation, the response time may lengthen from around 5 milliseconds to five hundred milliseconds.

The translational track, upon receipt of the request utterance, may be configured to translate the request utterance from the second language into a translated request utterance. The translated request utterance may be translated into the first language.

The translational track, following the translating, may compute a first intent of the translated request utterance and transmit the first intent to the multilingual chatbot system.

In parallel to the processing of the request utterance at the translational track, the intelligence track may be configured to process the request utterance. The intelligence track may be configured to receive the request utterance and generate, via the ML model, a ML request utterance.

The intelligence track may be further configured to compute a second intent based on the ML request utterance and transmit the second intent to the multilingual chatbot system.

The multilingual chatbot system may be configured to receive the first intent from the translational track and the second intent from the intelligence track.

The multilingual chatbot system may be configured, following the receipt of the first intent and the second intent, compare the first intent to the second intent.

The multilingual chatbot system may be configured to determine that the first intent matches the second intent.

Following the determining, the multilingual chatbot system may be configured to generate a response utterance in the second language. The response utterance may be based on the first intent and the second intent.

Following the generating of the response utterance, the multilingual chatbot system may be configured to transmit the response utterance as a response message to the remote user device. The response utterance may be in the default language. The response utterance may be in the second language.

In some embodiments, the multilingual chatbot system may transmit the first intent back to the translational track to generate the response utterance in the second language. The translational track may generate the response utterance in the second language based on the first intent.

In some embodiments, following the determining that the first intent matches the second intent, the system may be configured to leverage the intelligence track to generate the response utterance in the second language by feeding the second intent back through the intelligence track for generating the response utterance in the second language.

In some embodiments, when the first intent does not match the second intent, the system may be configured to transmit the request utterance, the first intent and the second intent to a human agent for generating the response utterance.

The human agent may gather all the data received and generate an appropriate response utterance. The human agent may leverage human intelligence, pre-stored dictionaries and additional sources to generate the response utterance.

Following the generating of the response utterance via the human agent, the system may be configured to re-train the ML model based on the response utterance generated by the human agent.

The system may be configured to re-train the ML model by feeding back the request utterance and the response utterance generated by the human agent to the ML model. The ML model may continuously be updated by response utterances generated by a human agent when the human agent intervenes. These responses may enhance the ML model and re-train the ML model in further requests.

In some embodiments, following the determining that the first intent does not match the second intent, the system may be configured to calculate a level of similarity between the first intent and the second intent.

In response to the level of similarity being higher than a threshold value, the system may be configured to generate a first targeted question utterance based on the first intent and a second targeted question utterance based on the second intent.

The first targeted question utterance and the second targeted question utterance may be retrieved from a library of pre-learned second language questions that may be available for transmitting to the user to verify what the user is requesting.

Both the first targeted question utterance and the second targeted question utterance may be transmitted to the remote user device. These two targeted questions may be displayed to a user associated with the remote user device as two selectable options.

In response to the transmittal of the first targeted question utterance and the second targeted question utterance to the remote user device, the system may be configured to receive a selection, from the remote user device, of either the first targeted question utterance or the second targeted question utterance.

The first targeted question and the second targeted question may be understood to refer to two alternative questions to which the user is referring. By selecting one of the two, the user confirms the user's intended request.

Following the receipt of the selection from the remote user device, the system may generate a response utterance.

In some embodiments, the level of similarity between the first and second intent may be calculated to being higher than the threshold value when at least one keyword included in the first intent matches at least one keyword in the second intent.

In response to the level of similarity being lower than the threshold value, the system may be configured to perform a confidence analysis to determine which of the two intents is a more confident intent for use for generating the response utterance. For the purposes of this application, a confidence score may be understood to reflect a value that reflects the degree of certitude of a predicted output based on the intent.

The ML model may include a dictionary of request utterances in the second language and a corresponding response utterance for each request utterance.

The ML model may be trained on training data that includes requests received in second languages mapped to appropriate responses. The training data may include artificial model data. The training data may include historical data that may include historical chat conversations in the second language. The target response may be based, at least in part, on a mapping. The mapping may associate certain requests received in the second language with certain responses and/or intents. The mapping may link certain request intents with certain responses. The mapping may link certain request intents with certain response intents, which may in turn be linked to certain response utterances.

Systems may be configured to compute, via a trained ML model, an intent of the request utterance. The intent of an utterance may include a representation of the meaning of the utterance. Computing the intent may include computing a numerical representation of the meaning. The numerical representation may, for example, include a score along multiple dimensions. Each dimension may represent a different aspect of meaning. The combination of scores along the multiple dimensions may be a multi-dimensional vector value that represents an overall meaning of the utterance. The intent may, in certain embodiments, be stored in a multi-dimensional vector data structure.

Systems may be configured to generate, via the trained ML model, a target response to the request utterance. The target response may be the output of an ML model. The ML model may be trained on training data that includes requests mapped to appropriate responses. The training data may include artificial model data. The training data may include historical data that may include historical chat conversations. The target response may be based, at least in part, on a mapping. The mapping may associate certain requests with certain responses. The mapping may link certain request intents with certain responses. The mapping may link certain request intents with certain response intents, which may in turn be linked to certain response utterances.

A method for reducing response time of an utterance received in a multilingual chatbot system may be provided. The utterance may be received in a language other than a default language with respect to the multilingual chatbot system.

The method may include receiving a request utterance from a remote user device. The request may represent a customer request.

The method may include determining that the request utterance is not in the default language.

In response to the determining, the method may include transmitting the request utterance, in parallel, to both a translational track for translating the request utterance and an intelligence track for translating the request utterance.

At the translational track, the method may include, receiving the request utterance. The method may further include, translating the request utterance from the second language into a translated request utterance. The translated request utterance being translated into the first language.

The method may further include computing a first intent of the translated request utterance. Following the computing, the method may include transmitting the first intent to the multilingual chatbot system.

At the intelligence track, the method may include receiving the request utterance. The method may further include generating, via a ML model, a ML request utterance. The method may further include computing a second intent based on the ML request utterance and transmitting the second intent to the multilingual chatbot system.

The method may further include, following the completion of the translating of the request utterance at the translational track and at the intelligence track, receiving the first intent from the translational track and the second intent from the intelligence track.

The method may further include comparing the first intent to the second intent. The method may further include determining that the first intent matches the second intent.

Following the determining, the method may include generating a response utterance and transmitting the response utterance as a response message to the remote user device.

In some embodiments the method may include, prior to transmitting the response utterance to the remote user device, feeding the response utterance to the translational track and the intelligence track for translating the response utterance to the second language.

It should be appreciated that when the first intent does not match the second intent, the method may include, in some embodiments, transmitting the request utterance, the first intent and the second intent to a human agent for generating the response utterance.

The human agent may analyze the request utterance, the first and second intent and determine a most accurate and appropriate response. The human agent may leverage historically stored utterances and corresponding responses for determining the response.

The method may further include, following the generating of the response utterance via the human agent, retraining the ML model based on the response utterance generated by the human agent.

The dual and parallel approach to linguistic analysis provided herein provides multiple advantages. The systems and methods described provide a two-part translation that is de-coupled from the processing of the utterance request itself. By de-coupling the translation of the input from the AI analysis, these systems and methods can be applied to any language without requiring separate processing. Furthermore, providing language translation internally that combines literal translation, with entity logic and historically selected translations, exceedingly speeds up the processing of each utterance received.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The multilingual chatbot system may include one or more computer servers 101. Computer 101 may be any computing device described herein, such as the remote computing device(s) transmitting input(s) to the multilingual chatbot system and the multilingual chatbot system. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory. Memory 115 may be memory within the smart card 326 and/or memory at the ATM 404.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

In some embodiments, computer 101 may be the ATM 404 and Terminals 141 and 151 may be the central server 402, and/or any of the mobile devices that may be in electronic communication with ATM 404 via LAN, WAN or any other suitable short-range communication when network connection 406 may not be established.

When used in a LAN networking environment, computer 101 is connected to LAN 125 through a LAN interface 113 or an adapter. When used in a WAN networking environment, computer 101 may include a modem 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a PAN such as Bluetooth NFC, ZigBee, or any other suitable personal area network. Short-range communication may be initiated when network connection between ATM 404 and central server 402 is not supported.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Software applications 119 may be stored within the non-transitory memory and/or other storage medium. Software applications may provide instructions to the processor that enable the server to perform various functions. For example, the non-transitory memory may store software applications such as an operating system 117, application programs 119, and an associated database 111. Some or all of the computer executable instructions of the server may be embodied in hardware or firmware components of the server.

The server may include cloud computing and virtualization implementations of software. Such implementations may be designed to run on a physical server supplied externally by a hosting provider, a client, or other virtualized platform.

Software application programs, which may be used by the server, may include computer executable instructions for invoking user functionality related to communication, such as email, short message service ("SMS"), and voice input and speech recognition applications. Software application programs may utilize one or more algorithms that formulate predictive machine responses, formulate database queries, process user inputs, process agent inputs, or any other suitable tasks.

Machine learning algorithms may identify patterns in traced data and make decisions about how to change a network based on the detected patterns. Machine learning algorithms improve over time because the algorithms are programmed to learn from previous decisions. Illustrative machine learning algorithms may include AdaBoost, Naive Bayes, Support Vector Machine and Random Forests. An illustrative machine learning algorithm may include a neural network such as Artificial Neural Networks and Convolutional Neural Networks. Generally, a neural network implements machine learning by passing an input through a network of neurons—called layers, and providing an output. The more layers of neurons that are included in the neural network, the "deeper" the neural network.

A neural network learns from outputs flagged as erroneous and adapts its neuron connections such that the next time the neural network receives a particular input it generates a more relevant output. To effectively provide relevant outputs, a neural network must first be trained by analyzing training data sets.

Neural networks learn from the training data sets and rearrange interconnection between layers of the network in response to processing the training data. The strength or weight of a connection between layers of the neural network can vary. A connection between two or more layers can be strong, weak or anywhere in between. A neural network may self-adapt by adjusting the strength of the connections among its layers to generate more accurate outputs.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
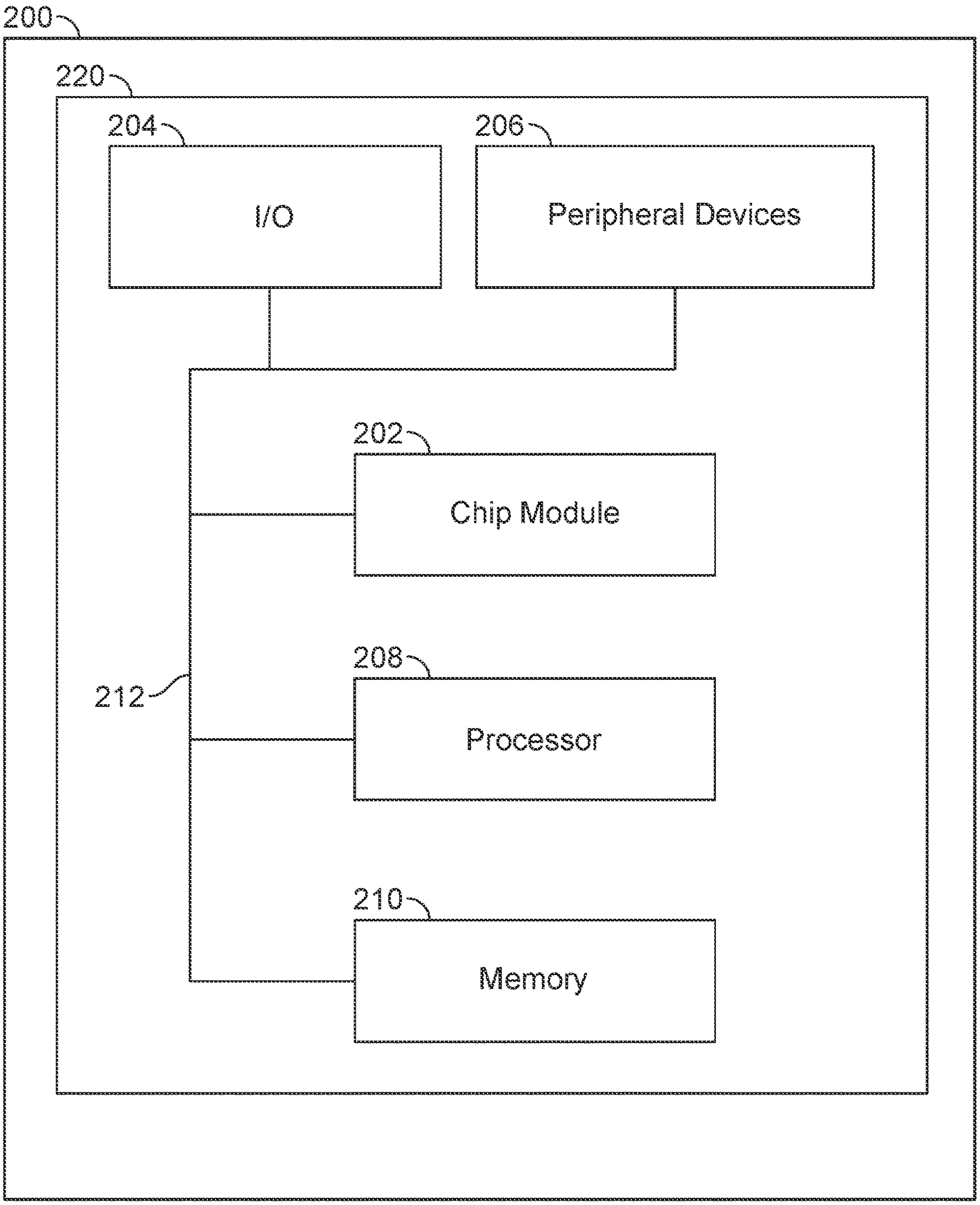
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
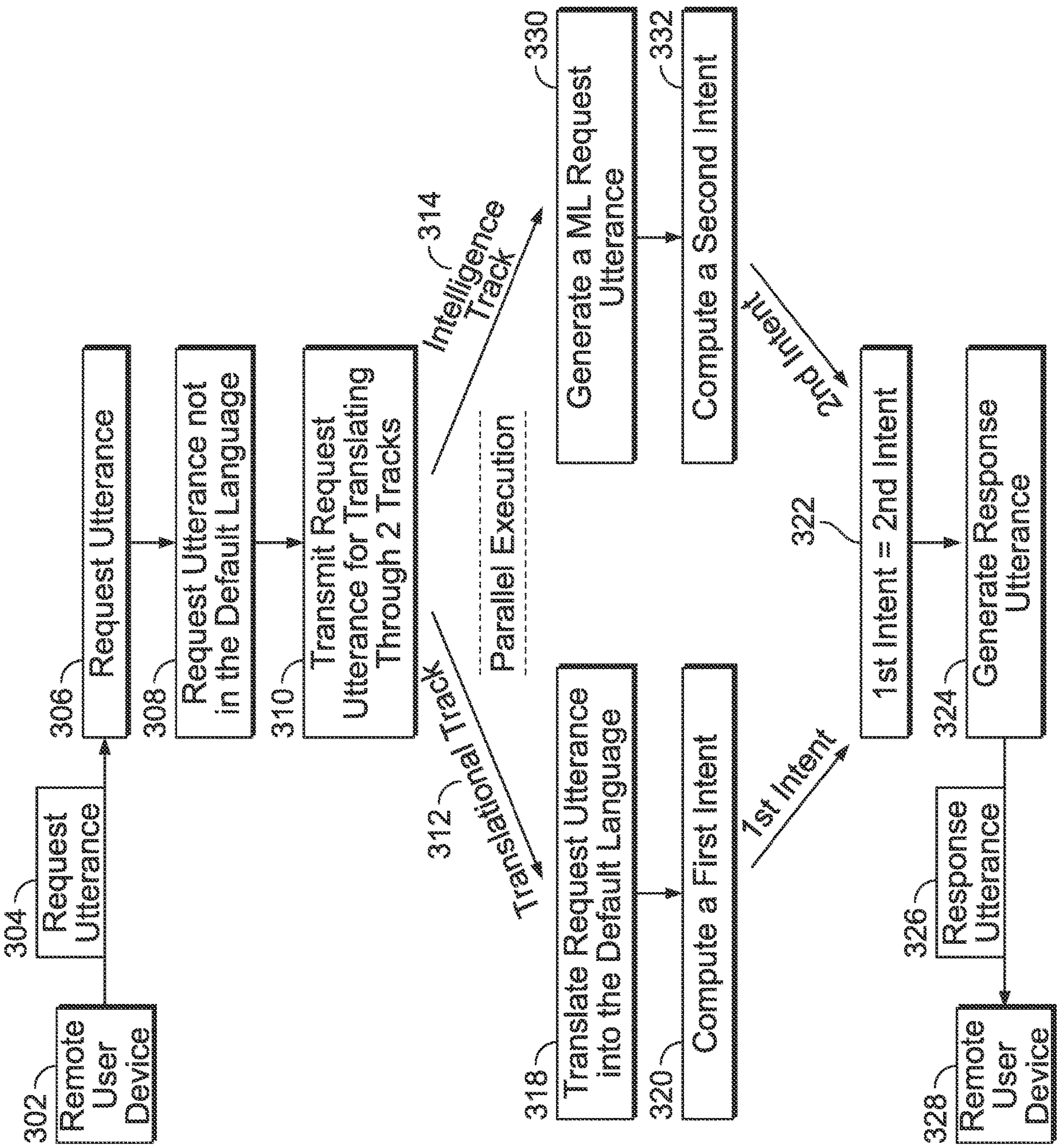
FIG. 3 shows an illustrative diagram in accordance with principles of the disclosure.

FIG. 3 shows an illustrative flow diagram of a multilingual chatbot system in accordance with principles of the disclosure. The multilingual chatbot system may be a system configured to receive input from remote user devices. The input may be for transmitting a question, performing a transaction and/or receiving comments from customers. The input may be transmitted in the form of text, chat, email, voice or any other suitable format.

In this illustrative diagram, a request utterance 304 may be transmitted from a remote user device 302 to the multilingual chatbot system.

At 306, the system may be configured to receive the request utterance 306. At 308, the system may determine that the request utterance is not in the default language.

When the system determines that a request utterance is not in the default language, the system may be configured to transmit the request utterance for translation. At 310, the system may transmit the request utterance through two different tracks. Request utterance 304 may be transmitted to translational track 312. Request utterance 304 may also be transmitted to intelligence track 314.

The intelligence track also performs translation, all be it by leveraging a ML library. Nevertheless this track is referred to as an intelligence track in order to differentiate between the literal translation of the translational track.

It should be appreciated that both tracks 312 and 314 may be executed, in parallel, for translating the request utterance, as shown at 316. Each of tracks 312 and 314 may run a translational algorithm and output an intent. The system may be configured to compare both outputs for a most accurate result.

At the translational track 312, the request utterance 304 may be translated into the default language, as shown at 318. At 320, the translational track 312 may compute a first intent.

At the intelligence track, 314, the request utterance 304 may be translated into the default language, as a ML request utterance, as shown at 330. Intelligence track 314 may then compute a second intent 332.

At 322, the multilingual chatbot system may receive the first intent from the translational track 312 and the second intent from the intelligence track 314. The system may compare the first intent to the second intent.

In this exemplary diagram, following the comparison, the system may determine that the first intent matches, or substantially matches, the second intent, as shown at 322. Following the determination, the system may generate a response utterance 326, as shown at 324.

The response utterance 326 may be based on either one or both of the tracks and may be transmitted to the remote user device 328.

Figure 4:
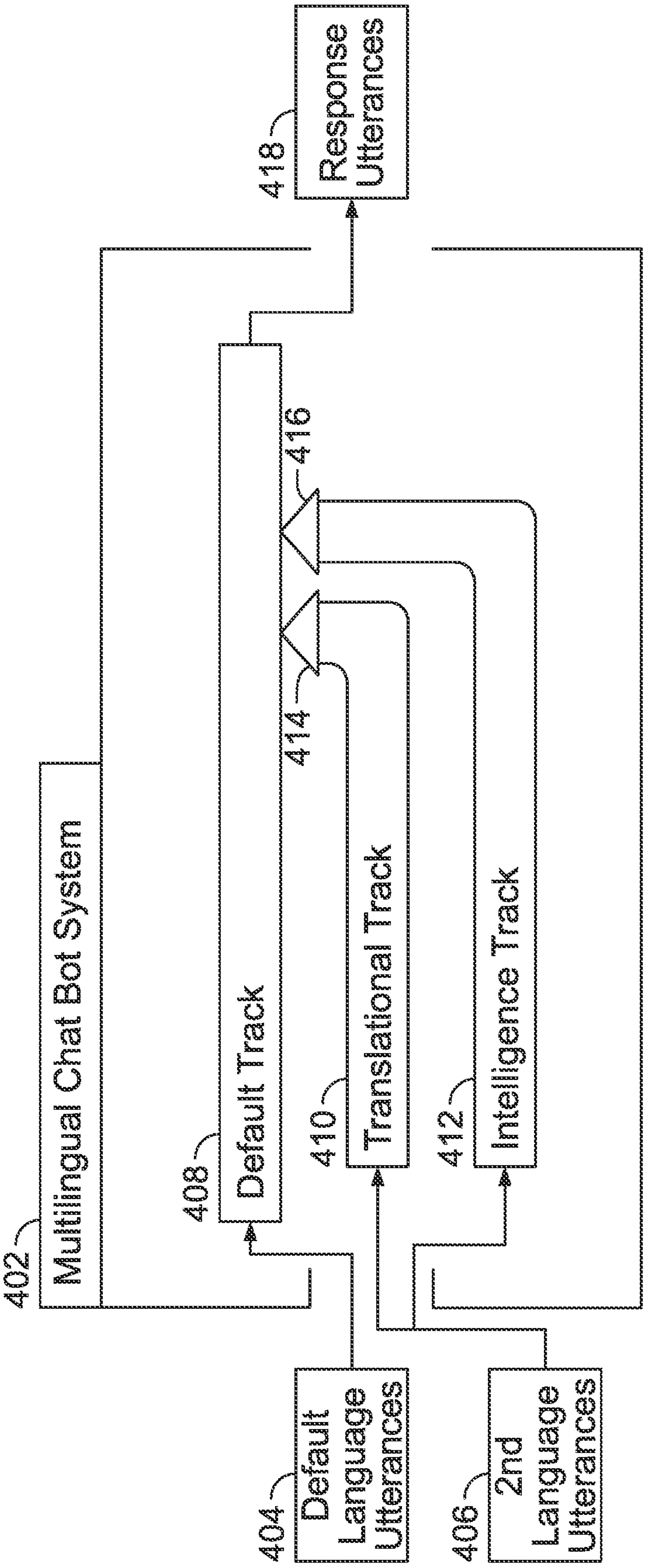
FIG. 4 shows an illustrative architecture diagram in accordance with principles of the disclosure.

FIG. 4 shows an illustrative architecture of the multilingual chatbot system in accordance with principles of the disclosure.

Multilingual chatbot system 402 may be a software application or computer program that may be enabled to simulate human conversation through voice or text interactions.

Multilingual chatbot system 402 may be enabled to receive utterances in any language. Multilingual chatbot system may include a default track 408. The default track 408 may be a default language track and may be configured for receiving default language request utterances 404. Second language utterances 406 may be transmitted to translational track 410 and intelligence track 412 prior to processing at default track 408.

Within the system, a translational track 410 and an intelligence track 412 may, at runtime, execute, in parallel, the translational algorithm for the utterance. Both the translational track 410 and the intelligence track 412 may, at runtime, translate the request utterance received and generate an output or an intent. The output and/or intent may be transmitted to the default track 408 for processing.

When an utterance is received at multilingual chatbot system 402, the system 402 may first determine the language of the utterance. When the language is in the default language, the utterance may be transmitted to the default track 408 for processing, as shown at 404. When the utterance is not in the default language, the system may transmit the utterance to both the translational track 410 and the intelligence track 412 for translating, as shown at 406. Following the translation, at both track 410 and track 412, of the request utterance, the translated request utterance is transmitted to the default track 408 for processing, as shown at 414 and 416.

The translational track 410 may perform an algorithm that may literally translate the request utterance from the second language to the default language.

The intelligence track 412 may use artificial intelligence ("AI") and ML to combine entity specific logic, native language connotations, and historically received utterances along with the literal translation, to generate a most accurate prediction of what the user is requesting.

Multilingual chatbot system 402 may be language agnostic. The translational track and intelligence track may perform all translational tracks and the default track may be configured for processing and outputting a response to the request utterances received. The response utterances 418, may be transmitted from the default track 408 to the user.

It should be appreciated that in some embodiments, following a generating of the response utterance via the default track, the response utterance may be transmitted back to the translational track 410 and the intelligence track 412 for translating the response utterance back into the second language.

In some embodiments, the response utterances 418 may be transmitted to the user in the default language.

This dual and parallel architecture includes a default language track and two underlying layers executed in parallel for translating, enhances the multilingual chatbot systems availability for customers where the native language is not the default language of the multilingual chatbot system. This dual and parallel architecture further speeds up the processing by at least one or more orders of magnitude.

Thus, systems and methods for reducing response time of an utterance received in a language other than a native language using a multilingual chatbot system is provided. Persons skilled in the art will appreciate that the present invention can be practiced by other than the described embodiments, which are presented for purposes of illustration rather than of limitation.

What is claimed is:

1. A multilingual chatbot system for reducing response time of an utterance received in a language other than a default language with respect to the multilingual chatbot system, the multilingual chatbot system configured to:

receive a request utterance from a remote user device, the request utterance representing a customer request;

determine that the request utterance is not in the default language, the default language being a first language and the request utterance being in a second language; and in response to the determining, transmit the request utterance, in parallel, to both a translational track for translating the request utterance and an intelligence track for translating the request utterance;

the translational track and the intelligence track are configured to process, in parallel, the request utterance;

the translational track configured to:

receive the request utterance;

translate the request utterance from the second language into a translated request utterance, the translated request utterance being translated into the first language;

compute a first intent of the translated request utterance; and transmit the first intent to the multilingual chatbot system;

the intelligence track configured to:

receive the request utterance;

generate, via a ML model, a ML request utterance;

compute a second intent based on the ML request utterance; and transmit the second intent to the multilingual chatbot system; and the multilingual chatbot system configured to:

receive the first intent from the translational track and the second intent from the intelligence track;

compare the first intent to the second intent;

in response to determining that the first intent matches the second intent:

generate a response utterance, the response utterance based on the first intent and the second intent; and transmit the response utterance as a response message to the remote user device; and in response to determining that the first intent does not match the second intent, calculate a level of similarity between the first intent and the second intent;

in response to determining that the level of similarity is higher than a threshold value:

generate a first targeted question utterance based on the first intent and a second targeted question utterance based on the second intent;

transmit the first targeted question utterance and the second targeted question utterance to the remote user device; and in response to the transmittal of the first targeted question utterance and the second targeted question utterance to the remote user device, receive a selection, from the remote user device, of either the first targeted question utterance or the second targeted question utterance.

2. The system of claim 1 wherein following the determining that the first intent matches the second intent, the system is configured to leverage the translational track to generate the response utterance in the second language by feeding the first intent back through the translational track for generating the response utterance.

3. The system of claim 1 wherein following the determining that the first intent matches the second intent, the system is configured to generate the response utterance.

4. The system of claim 1 wherein when the system determines that the first intent does not match the second intent, the system is configured to transmit the request utterance, the first intent and the second intent to a human agent for generating the response utterance.

5. The system of claim 4 wherein following the generating of the response utterance via the human agent, the system is configured to re-train the ML model based on the response utterance generated by the human agent.

6. The system of claim 5 wherein the system is configured to re-train the ML model by feeding back the request utterance and the response utterance generated by the human agent to the ML model.

7. The system of claim 1 wherein the default language is English.

8. The system of claim 7 wherein the second language is any language other than English.

9. The system of claim 1 wherein the ML model comprises a dictionary of request utterances in the second language and a corresponding response utterance for each request utterance.

10. A method for reducing response time of an utterance received in a multilingual chatbot system, the utterance received in a language other than a default language with respect to the multilingual chatbot system, the method comprising:
- receiving a request utterance from a remote user device, the request utterance representing a customer request;
- determining that the request utterance is not in the default language, the default language being a first language and the request utterance being in a second language; and
- in response to the determining, transmitting the request utterance, in parallel, to both a translational track for translating the request utterance and an intelligence track for translating the request utterance;
- at the translational track:
  - receiving the request utterance;
  - translating the request utterance from the second language into a translated request utterance, the translated request utterance being translated into the first language;
  - computing a first intent of the translated request utterance; and
  - transmitting the first intent to the multilingual chatbot system;
- at the intelligence track:
  - receiving the request utterance;
  - generating, via a ML model, a ML request utterance;
  - computing a second intent based on the ML request utterance; and
  - transmitting the second intent to the multilingual chatbot system;
- receiving the first intent from the translational track and the second intent from the intelligence track;
- comparing the first intent to the second intent;
- in response to determining that the first intent matches the second intent:
  - generating a response utterance; and
  - transmitting the response utterance as a response message to the remote user device;
  - in response to determining that the first intent does not match the second intent, calculating a level of similarity between the first intent and the second intent, the calculating comprising:
    - when at least one keyword included in the first intent matches at least one keyword in the second intent, the level of similarity is determined to be higher than a threshold value, and the method comprises:
      - generating a first targeted question utterance based on the first intent and a second targeted question utterance based on the second intent; and
      - transmitting the first targeted question utterance and the second targeted question utterance to the remote user device; and
  - in response to the level of similarity being lower than the threshold value:
    - performing a confidence analysis to determine which of the first intent and second intent is a more confident intent for use for generating the response utterance; and
    - using the more confident intent in generating the response utterance.

11. The method of claim 10 wherein the response utterance is in the default language.

12. The method of claim 11 further comprising, prior to transmitting the response utterance to the remote user device, feeding the response utterance to the translational track and the intelligence track for translating the response utterance to the second language.

13. The method of claim 10 wherein, when the first intent does not match the second intent, the method comprises transmitting the request utterance, the first intent and the second intent to a human agent for generating the response utterance.

14. The method of claim 13 wherein, following the generating of the response utterance via the human agent, the method comprises retraining the ML model based on the response utterance generated by the human agent.

* * * * *